(12) United States Patent
Zheng et al.

(10) Patent No.: US 9,170,361 B2
(45) Date of Patent: Oct. 27, 2015

(54) BACKLIGHT MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventors: Weixin Zheng, Beijing (CN); Dongsheng Yang, Beijing (CN); Zhonglian Qiao, Beijing (CN); Xiuzhen Li, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 177 days.

(21) Appl. No.: 13/979,936

(22) PCT Filed: Mar. 1, 2013

(86) PCT No.: PCT/CN2013/072090
§ 371 (c)(1),
(2) Date: Jul. 16, 2013

(87) PCT Pub. No.: WO2013/135143
PCT Pub. Date: Sep. 19, 2013

(65) Prior Publication Data
US 2014/0063848 A1 Mar. 6, 2014

(30) Foreign Application Priority Data
Mar. 16, 2012 (CN) .................. 2012 2 0102414 U

(51) Int. Cl.
*G02B 6/43* (2006.01)
*F21V 8/00* (2006.01)

(52) U.S. Cl.
CPC .............. *G02B 6/0028* (2013.01); *G02B 6/001* (2013.01); *G02B 6/0091* (2013.01)

(58) Field of Classification Search
CPC .... G02B 6/001; G02B 6/0023; G02B 6/0028; G02B 6/0091; F21V 2200/15; F21V 2200/20
USPC ......... 362/551, 554, 555, 556, 558, 560, 609, 362/610; 40/546
See application file for complete search history.

(56) References Cited

U.S. PATENT DOCUMENTS 5,572,818 A * 11/1996 Churchill ........................ 40/547
5,857,761 A * 1/1999 Abe et al. ...................... 362/551
(Continued)

FOREIGN PATENT DOCUMENTS

| CN | 101216632 A | 7/2008 |
| CN | 202452315 U | 9/2012 |

(Continued)

OTHER PUBLICATIONS

International Preliminary Report on Patentability Appln. No. PCT/CN2013/072090; Dated Sep. 16, 2014.
(Continued)

*Primary Examiner* — Alan Cariaso
(74) *Attorney, Agent, or Firm* — Ladas & Parry LLP

(57) ABSTRACT

According to the present disclosure, there are provided a backlight module and a display device. With the backlight module, a heat dissipating device can be saved, and a light guide plate is prevented from being warped and deformed due to heat generation of a light source. The backlight module comprises a light source, a light guide plate and a side-glowing optical fiber. The side-glowing optical fiber includes: a light emitting section which is fixed to at least one side of the light guide plate; and a light guide section, which extends from the light emitting section to the outside of the light guide plate, and a terminal of which is connected to the light source.

11 Claims, 5 Drawing Sheets

(56) References Cited

U.S. PATENT DOCUMENTS

| | | | |
|---|---|---|---|
| 5,915,855 A * | 6/1999 | Murase et al. | 40/546 |
| 6,655,825 B2 * | 12/2003 | Muthu et al. | 362/561 |
| 8,724,942 B2 * | 5/2014 | Logunov et al. | 385/31 |
| 2005/0237761 A1 * | 10/2005 | Lasota | 362/551 |
| 2008/0037276 A1 * | 2/2008 | Tzeng et al. | 362/610 |
| 2010/0238374 A1 | 9/2010 | Ohse | |
| 2014/0063848 A1 | 3/2014 | Zheng et al. | |

FOREIGN PATENT DOCUMENTS

| | | |
|---|---|---|
| JP | 2010-218980 A | 9/2010 |
| KR | 20040043618 A | 5/2004 |
| KR | 100889537 B1 | 3/2009 |
| KR | 20100052420 A | 5/2010 |

OTHER PUBLICATIONS

International Search Report mailed Jun. 6, 2013; PCT/CN2013/072090.

Korean Examination Opinion dated Jun. 27, 2014; Appln. No. 10-2013-7018957.

* cited by examiner

BACKLIGHT MODULE AND DISPLAY DEVICE

FIELD OF THE INVENTION

The present disclosure relates to a backlight module and a display device.

BACKGROUND

Liquid crystal display panels do not emit light themselves, and in order that contents displayed in liquid crystal display devices can be seen, they need backlight modules to provide them with light sources. An edge-lit backlight module includes a light guide plate and a light source that is disposed on a side of the light guide plate. The edge-lit backlight module is capable of converting a point light source or a linear light source which is disposed on a side of the light guide plate into an area light source, so as to provide a liquid crystal display panel with backlight.

The light source disposed on the side of the light guide plate gives out a large amount of heat while it emits light, resulting in a fact that warping and deformation occur in a position adjacent to the light source. Thus, badness such as a light leaking phenomenon or the like is caused. Therefore, for the sake of preventing the light guide plate from being warped and deformed owing to heat generation of the light source, it is also necessary to add a heat dissipating device. For example, a heat-dissipating adhesive tape is used to fix the light source and a heat dissipating block together.

SUMMARY

Embodiments of the present disclosure provide a backlight module and a display device, with which, a heat dissipating device is saved, and a light guide plate is prevented from being warped and deformed due to heat generation of a light source.

For solving the above technical problems, embodiments of the present disclosure adopt the following technical solutions:

According to an embodiment of the present disclosure, there is provided a backlight module, comprising: a light source; a light guide plate, one primary surface of which is a light exiting face; and a side-glowing optical fiber. The side-glowing optical fiber comprises a light emitting section and a light guide section, the light emitting section is fixed to at least one side of the light guide plate, the light guide section extends from the light emitting section to the outside of the light guide plate, and a terminal of the light guide section is connected to the light source.

In one example, the light source is connected to the terminal of the light guide section of the side-glowing optical fiber through a coupler.

In one example, the light emitting section of the side-glowing optical fiber is closely attached to the at least one side of the light guide plate.

In one example, on one side of the light emitting section of the side-glowing optical fiber which is not in contact with the light guide plate, there is provided a light-tight cladding; and around the light guide section of the side-glowing optical fiber, there is provided a light-tight cladding.

In one example, the backlight module further comprises: a side reflector disposed on a side of the light guide plate, the side reflector being disposed in opposition to the light guide plate with respect to the light emitting section of the side-glowing optical fiber.

In one example, the backlight module further comprises: a bottom reflector that is disposed on one face side of the light guide plate which is opposite to the light exiting face.

In one example, the side-glowing optical fiber is one side-glowing optical fiber.

In one example, the side-glowing optical fiber is four side-glowing optical fibers; and light emitting sections of the four side-glowing optical fibers are closely attached to four sides of the light guide plate, respectively.

In one example, the side-glowing optical fiber is at least one row of side-glowing optical fibers that is constituted by a plurality of side-glowing optical fiber in parallel.

In one example, the side-glowing optical fiber is four rows of side-glowing optical fibers, each row being constituted by a plurality of side-glowing optical fiber in parallel.

According to another embodiment of the present disclosure, there is provided a backlight module, comprising: a light source; a light guide plate, one primary surface of which is a light exiting face; and a side-glowing optical fiber. The side-glowing optical fiber comprises a light emitting section and a light guide section, the light emitting section is fixed to one face side of the light guide plate which is opposite to the light exiting face, the light guide section extends from the light emitting section to the outside of the light guide plate, and a terminal of the light guide section is connected to the light source.

In one example, the side-glowing optical fiber comprises a plurality of side-glowing optical fibers arranged in parallel.

In one example, the plurality of side-glowing optical fibers are distributed over the whole primary surface of the light guide plate which is opposite to the light exiting face.

In one example, the plurality of side-glowing optical fibers are distributed uniformly.

In one example, the backlight module further comprises: a side reflector disposed on a side of the light guide plate and a bottom reflector disposed on a face side of the light guide plate which is opposite to the light exiting face, the bottom reflector being disposed in opposition to the light guide plate with respect to the side-glowing optical fiber.

According to still another embodiment of the present disclosure, there is provided a display device, comprising the backlight module according to any of the embodiments as mentioned above.

As regards the backlight module and the display device which are provided by embodiments of the present disclosure, heat will not be generated during light emission of a side-glowing optical fiber, so a light source can be placed outside the whole backlight module by using the side-glowing optical fiber to transmit light emitted from the light source to a light guide plate, without the necessity of arranging the light source in the vicinity of the light guide plate to provide the light guide plate with light directly. The light source is far away from the light guide plate, and therefore, the light guide plate is avoided from being warped and deformed due to heat generation of the light source, and a heat dissipating device is saved.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Figure 1:
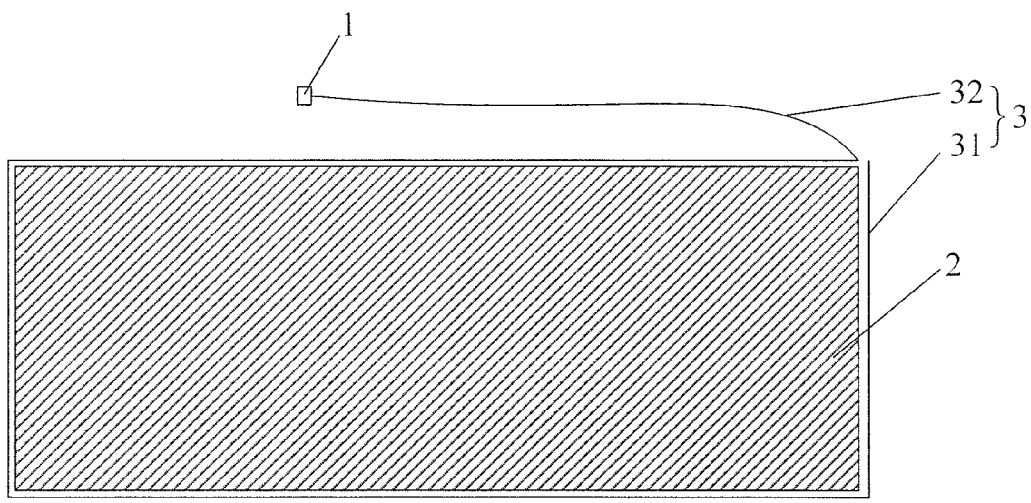
FIG. 1 is a schematic plan view showing a backlight module in an embodiment according to the present disclosure.

As shown in FIG. 1, an embodiment of the present disclosure provides a backlight module, which includes a light source 1 and a light guide plate 2. The light source 1 includes but is not limited to: a single Light Emitting Diode (LED), a plurality of LEDs, a laser source, a Cold Cathode Fluorescent Lamp (CCFL), an Electro Luminescence (EL) lamp or an incandescent lamp. For example, the light guide plate 2 comprises two primary surfaces, one of which is a light exiting face. The light guide plate may further include one side or a plurality of sides. For example, when the light guide plate is in a rectangular shape, the light guide plate has four sides. The above backlight module further includes a side-glowing optical fiber 3. The side-glowing optical fiber 3 can transmit lights and let the lights be evenly scattered at a surface of the optical fiber. Side-glowing optical fibers can be classified into a solid core side-glowing optical fiber and a liquid core side-glowing optical fiber. Core materials for the solid core side-glowing optical fiber are mainly quartz, multi-component glass and polymers; and core materials for the liquid core side-glowing optical fiber are silicone oil and other liquids. The side-glowing optical fiber 3 comprises a light emitting section 31, which is fixed to at least one side of the light guide plate 2 in a specific fixing manner that includes but is not limited to: glue adhering, molecular bonding, injection molding or mechanical fixation; and the side-glowing optical fiber 3 further comprises a light guide section 32, which extends from the light emitting section 31 to the outside of the light guide plate 2, and a terminal of which is connected to the light source 1. Light emitted from the light source 1 is incident into the side-glowing optical fiber 3 from the terminal of the light guide section 32, transmitted to the light emitting section 31 through the light guide section 32 of the side-glowing optical fiber 3, next, emitted from a surface of the light emitting section 31 and incident into the light guide plate 2, and then, supplied by the light guide plate 2 as a backlight to a panel of the liquid crystal display device.

As regards the backlight module provided by the embodiment of the present disclosure, heat will not be generated during light emission of a side-glowing optical fiber, so a light source can be placed outside the whole backlight module by using the side-glowing optical fiber to transmit the light emitted from the light source to a light guide plate, without the necessity of arranging the light source in the vicinity of the light guide plate to provide the light guide plate with light directly. The light source is far away from the light guide plate, so that the light guide plate is avoided from being warped and deformed due to heat generation of the light source, a heat dissipating device is saved, and position setting of the light source is more freely for the convenience of its detachment.

Figure 2:
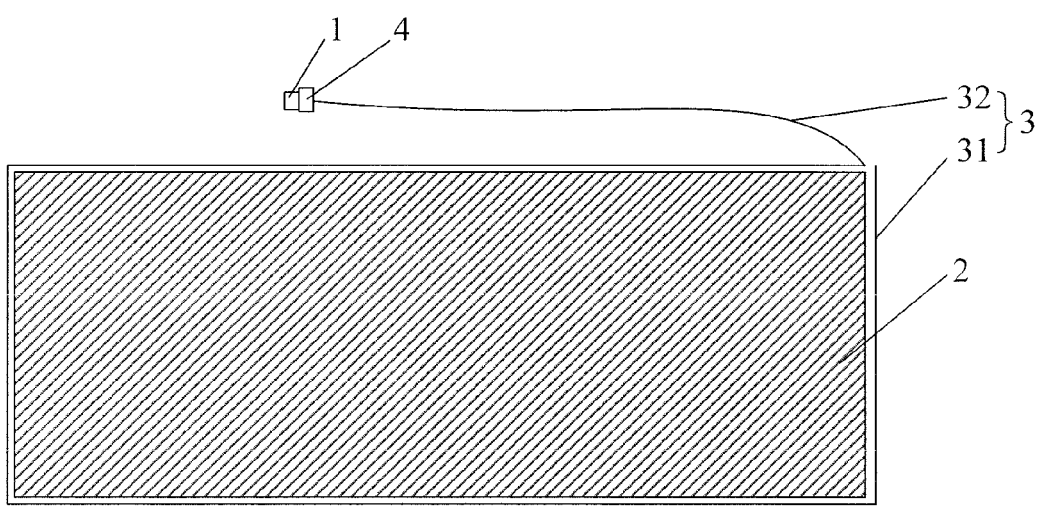
FIG. 2 is a schematic plan view showing another backlight module in an embodiment according to the present disclosure.

As shown in FIG. 2, in an embodiment, a light source 1 and a terminal of a light guide section 32 of a side-glowing optical fiber 3 can be connected through a coupler 4. The coupler 4 acts to precisely align a light exiting end-face of the light source 1 and an end face at the terminal of the light guide section 32 of the side-glowing optical fiber 3, so as to allow the light energy generated by the light source 1 to be coupled into the side-glowing optical fiber 3 to the maximum limit for transmission.

Figure 3:
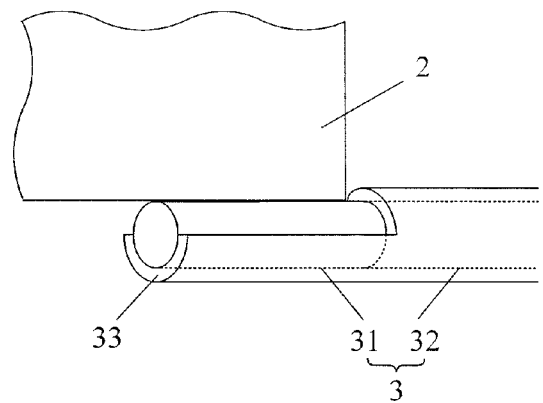
FIG. 3 is a schematically perspective view showing a side-glowing optical fiber in an embodiment according to the present disclosure.

As shown in FIG. 3, in an embodiment, a light emitting section 31 of a side-glowing optical fiber 3 is closely attached to at least one side of a light guide plate 2; on one side of the light emitting section 31 of the side-glowing optical fiber 3 which is not in contact with the light guide plate 2, there is provided a light-tight cladding 33, so that light to be scattered out of the light emitting section 31 will not exit from the one side which is not in contact with the light guide plate 2, and thereby the utilization rate of light is increased; around the light guide section 32 of the side-glowing optical fiber 3, there is provided a light-tight cladding 33, and as such, the light will not be scattered out at a location far from the light guide plate 2, so that the light is transmitted within the light guide section 32 more effectively, and moreover light leakage is avoided.

Figure 4:
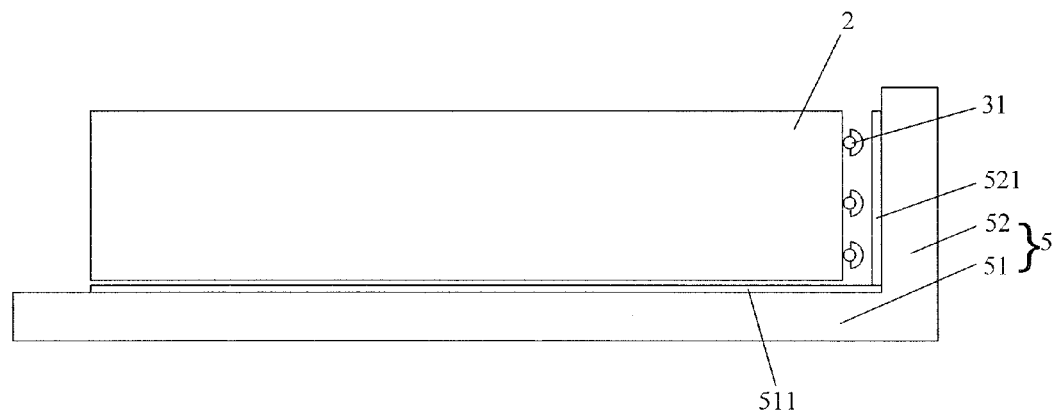
FIG. 4 is a schematically cross-sectional view showing another backlight module in an embodiment according to the present disclosure.

As shown in FIG. 4, in an embodiment, the above backlight module further includes: a rear plate 5, comprising a bottom plate 51 which is disposed under the light guide plate 2 and a side plate 52 which is disposed around the light guide plate 2. The light emitting section 31 of the side-glowing optical fiber is located between a side of the light guide plate 2 and the side plate 52. The backlight module may further comprise: a bottom reflector 511 disposed between the light guide plate 2 and the bottom plate 51, which serves to reflect light in the light guide plate 2 which irradiates onto the bottom reflector 511 back to the light exiting face of the light guide plate 2; and a side reflector 521 disposed on the side of the light guide plate 2, which may be disposed on one side or a plurality of sides of the light guide plate 2 according to requirements. The side reflector 521 is located between the light emitting section 31 of the side-glowing optical fiber and the side plate 52, namely, the side reflector 521 is located on an outer side of the light emitting section 31 of the side-glowing optical fiber. That is, the side reflector 521 is disposed in opposition to the light guide plate with respect to the light emitting section 31. The light emitting section 31 of the side-glowing optical fiber can be fixed to the light guide plate 2 or the reflector 521, and the side reflector 521 serves to reflect light that exits out of the side of the light guide plate 2 back into the light guide plate 2. Specifically, it is possible that the side reflector 521 is formed by means of bending the bottom reflector 511 upward, or formed by means of coating a high reflecting layer on a part of the side plate 52 which faces the light guide plate 2 directly.

Figure 5:
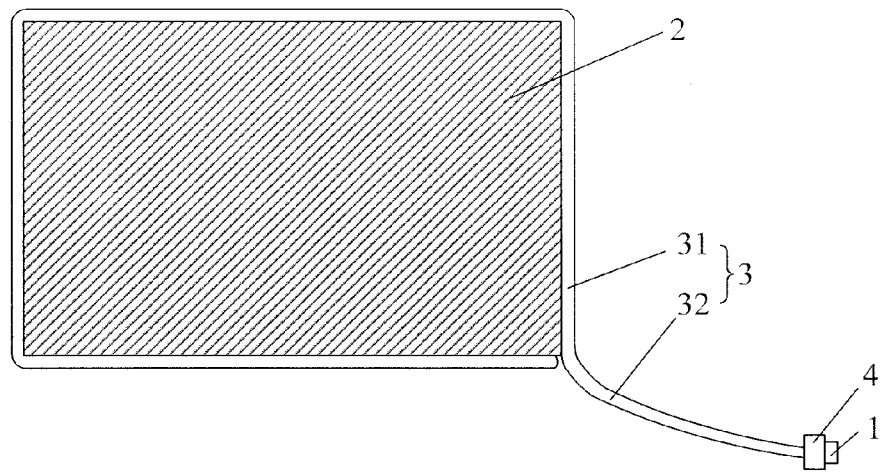
FIG. 5 is a schematic plan view in which the side-glowing optical fiber is illustrated as one side-glowing optical fiber in an embodiment according to the present disclosure.

As shown in FIG. 5, optionally, the side-glowing optical fiber 3 may be formed as one side-glowing optical fiber. A light emitting section 31 of the above one side-glowing optical fiber 3 encircles a light guide plate 2 in such a manner that it is closely attached to four sides of the light guide plate 2, and a light source 1 is connected to a terminal of a light guide section 32 through a coupler 4.

Figure 6:
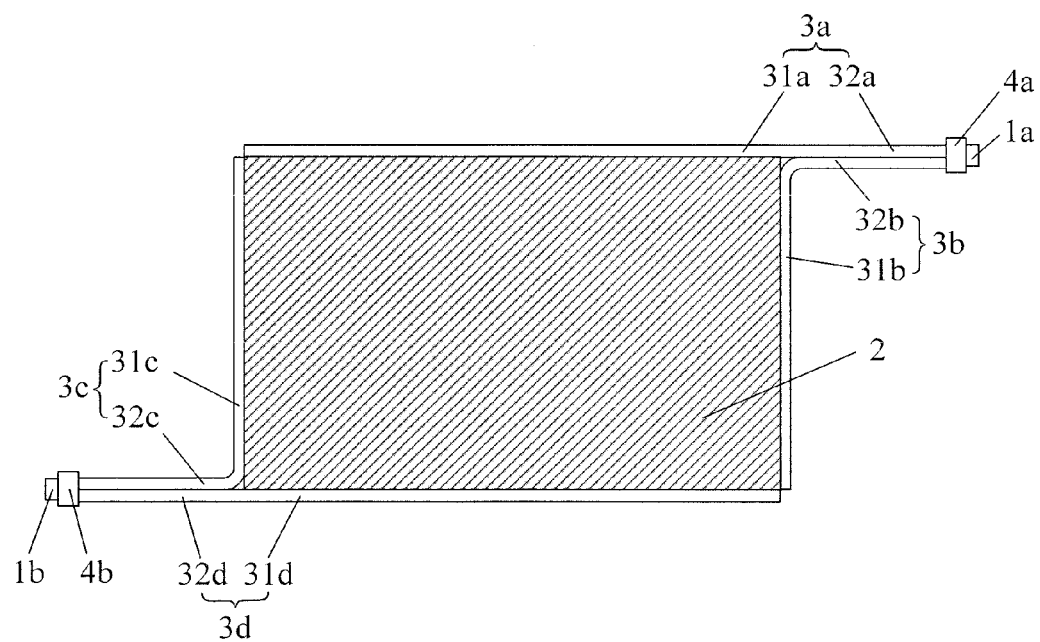
FIG. 6 is a schematic plan view in which the side-glowing optical fiber is illustrated as four side-glowing optical fibers in an embodiment according to the present disclosure.

As shown in FIG. 6, optionally, the side-glowing optical fiber may also be formed as four side-glowing optical fibers, which includes a first optical fiber 3a, a second optical fiber 3b, a third optical fiber 3c and a fourth optical fiber 3d, and light emitting sections 31a, 31b, 31c and 31d of the four side-glowing optical fibers are closely attached to four sides of a light guide plate 2, respectively. A first light source 1a is connected to terminals of light guide sections 32a and 32b for the first optical fiber 3a and the second optical fiber 3b that are adjacent to it through a first coupler 4a, and provides light to the first optical fiber 3a and the second optical fiber 3b simultaneously. A second light source 1b is connected to terminals of two light guide sections 32c and 32d for the third optical fiber 3c and the fourth optical fiber 3d that are adjacent to it through a second coupler 4b, and provides light to the third optical fiber 3c and the fourth optical fiber 3d simultaneously. There may also be the case that four light sources provide light to four side-glowing optical fibers in such a manner that they are connected to the four side-glowing optical fibers through four couplers, respectively, or other connecting manner. On respective ones of sides of the light emitting sections 31a, 31b, 31c and 31d for the above four side-glowing optical fibers which are not in contact with the light guide plate 2, there are provided light-tight claddings, so that lights to be scattered out of the light emitting sections 31a, 31b, 31c and 31d will not exit from the respective ones of sides which is not in contact with the light guide plate 2, and thereby the utilization rate of light is increased. Around the light guide sections 32a, 32b, 32c and 32d of the above four side-glowing optical fibers, there are provided light-tight claddings, and as such, the lights will not be scattered out at a location far from the light guide plate 2, so that the lights are transmitted within the light guide sections 32a, 32b, 32c and 32d more effectively, and moreover light leakage is avoided.

Figure 7:
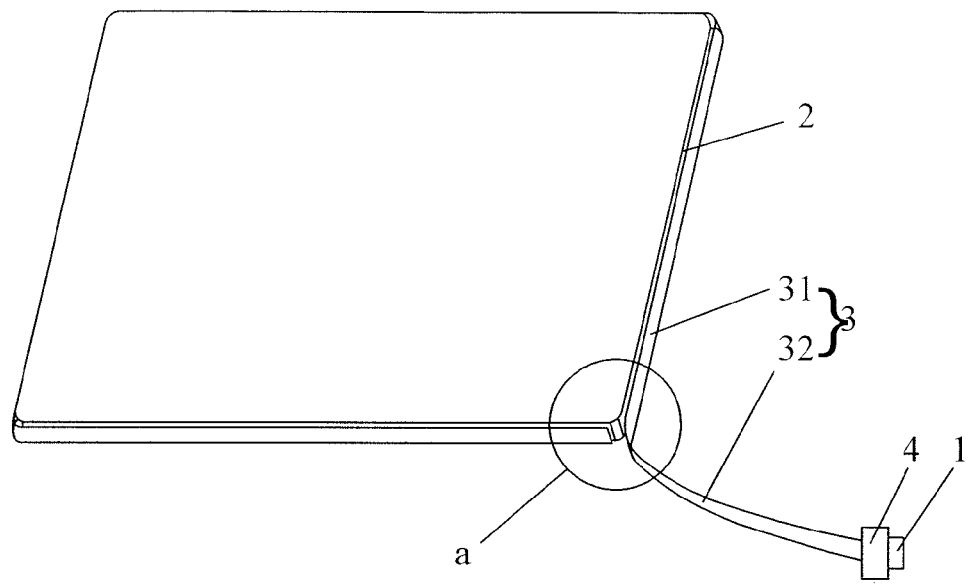
FIG. 7 is a schematically perspective view in which the side-glowing optical fiber is illustrated as one row of side-glowing optical fibers in an embodiment according to the present disclosure.
Figure 8:
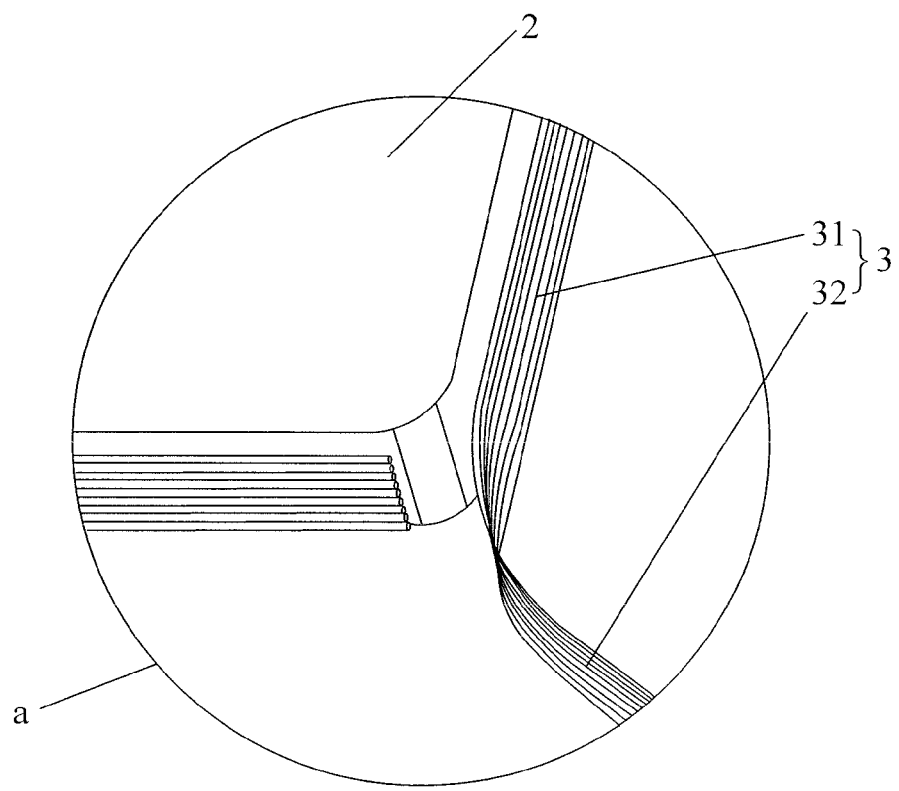
FIG. 8 is a partially enlarged schematic view showing a backlight module a in FIG. 7.

As shown in FIG. 7 and FIG. 8, optionally, the side-glowing optical fiber 3 may also be formed as one row of side-glowing optical fibers that is constituted by a plurality of side-glowing optical fibers in parallel. FIG. 8 is an enlarged view showing a portion "a" in FIG. 7. As shown in FIG. 8, the plurality of side-glowing optical fibers may be arranged in parallel along a thickness direction of a light guide plate. Light emitting sections 31 of the one row of side-glowing optical fibers 3 encircles the light guide plate 2 in such a manner that they are closely attached to four sides of the light guide plate 2, and on one side of a light emitting section 31 for each of the side-glowing optical fibers 3 which is not in contact with the light guide plate 2, there is provided a light-tight cladding, so that light to be scattered out of the light emitting section 31 will not exit from the one side which is not in contact with the light guide plate 2, and thereby the utilization rate of light is increased. Around a light guide section 32 of each of the side-glowing optical fibers 3, there is provided a light-tight cladding; and as such, the light will not be scattered out at a location far from the light guide plate 2, so that the light is transmitted within the light guide section 32 more effectively, and moreover light leakage is avoided. A light source 1 is connected to a terminal of a light guide section 32 for each of the side-glowing optical fibers 3 through a coupler 4.

Figure 9:
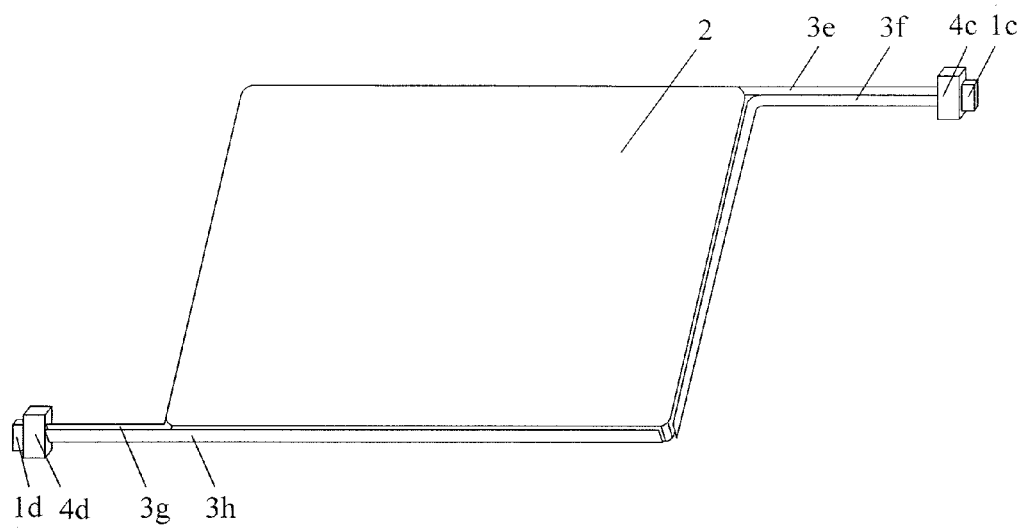
FIG. 9 is a schematically perspective view in which the side-glowing optical fiber is illustrated as four rows of side-glowing optical fibers in an embodiment according to the present disclosure.

As shown in FIG. 9, optionally, the side-glowing optical fiber may also be formed as four rows of side-glowing optical fibers, each of which is constituted by a plurality of side-glowing optical fibers in parallel, and which include a first row of optical fibers 3e, a second row of optical fibers 3f, a third row of optical fibers 3g and a fourth row of optical fibers 3h. The plurality of side-glowing optical fibers in each row of optical fibers 3e, 3f, 3g or 3h are arranged, for example, along a thickness direction of a light guide plate in parallel. Light emitting sections of the four rows of side-glowing optical fibers are closely attached to four sides of the light guide plate 2, respectively, and on respective ones of sides of the light emitting sections for the four rows of side-glowing optical fibers which is not in contact with the light guide plate 2, there are provided light-tight claddings, so that light to be scattered out of the light emitting sections will not exit from the respective ones of sides which is not in contact with the light guide plate 2, and thereby the utilization rate of light is increased. A third light source 1c is connected to terminals of light guide sections for the first row of optical fibers 3e and the second row of optical fibers 3f that are adjacent to it through a third coupler 4c, and provides light to the first row of optical fibers 3e and the second row of optical fibers 3f simultaneously. A fourth light source 1d is connected to terminals of light guide sections in two rows for the third rows of optical fibers 3g and the fourth row of optical fibers 3f that are adjacent to it through a fourth coupler 4d, and provides light to the third row of optical fibers 3g and the fourth row of optical fibers 3f simultaneously. There may also be the case that four light sources provide light to four rows of side-glowing optical fibers in such a manner that they are connected to the four rows of side-glowing optical fibers through four couplers, respectively, or other connecting manner. Around light guide sections of the four rows of side-glowing optical fibers, there are provided light-tight claddings; and as such, lights will not be scattered out at a location far from the light guide plate 2, so that the lights are transmitted within the light guide sections more effectively, and moreover light leakage is avoided.

It is to be noted that, in each row of side-glowing optical fibers as stated above, the plurality of side-glowing optical fibers arranged in parallel may be distributed uniformly, namely, distances between adjacent optical fibers are equal, and the plurality of side-glowing optical fibers arranged in parallel may also be distributed non-uniformly.

As regards the backlight module provided by embodiments of the present disclosure, heat will not be generated during light emission of the side-glowing optical fiber, so a light source can be placed outside the whole backlight module by using the side-glowing optical fiber to transmit light emitted from the light source to a light guide plate, without the necessity of arranging the light source in the vicinity of the light guide plate to provide the light guide plate with light directly. The light source is far away from the light guide plate, so that the light guide plate is avoided from being warped and deformed due to heat generation of the light source, a heat dissipating device is saved, and position setting of the light source is more freely for the convenience of its detachment. Moreover, the side-glowing optical fiber is capable of converting a point light source into a linear light source for uniform scattering, and therefore, as compared to the case that point light sources are placed on a side of a light guide plate directly, a lesser number of point light sources can be used to achieve a uniform reception of light by the light guide plate. Thus, the utilization rate of light is higher, and the number of light sources is reduced. As an optical fiber is relatively thin and its diameter can reach the micron level, the light guide plate and the backlight module can also be made to be thinner accordingly.

In the above embodiments, edge-lit backlight modules have been described as examples. However, the technical solutions according to the present disclosure are not limited to the edge-lit backlight modules. For example, the backlight modules according to the present disclosure may also be direct-lit backlight modules. According to an embodiment of the present disclosure, there is provided a direct-lit backlight module, comprising: a light source; a light guide plate, one primary surface of which is a light exiting face; and a side-glowing optical fiber. The side-glowing optical fiber includes a light emitting section which is fixed to a face side of the light guide plate which is opposite to the light exiting face, and a light guide section, which extends from the light emitting section to the outside of the light guide plate, and a terminal of which is connected to the light source. In an example, the side-glowing optical fiber includes a plurality of side-glowing optical fibers arranged in parallel. For example, the plurality of side-glowing optical fibers may be distributed over the whole primary surface of the light guide plate which is opposite to the light exiting face. For example, the plurality of side-glowing optical fibers may be distributed uniformly. Similar to the edge-lit backlight modules stated as above, the direct-lit backlight module according to the embodiment of the present disclosure may also include a side reflector and a bottom reflector. For example, the side reflector is disposed on one side of the light guide plate, and the bottom reflector is disposed in opposition to the light guide plate with respect to the side-glowing optical fibers. In addition, as regards the direct-lit backlight module according to the embodiment of the present disclosure, except that the setting position of the side-glowing optical fibers with respect to the light guide plate is different, other structures and constituent elements are the same as or similar to those of the above-described edge-lit backlight modules, details being omitted here.

According to an embodiment of the present disclosure, there is further provided a display device, comprising the backlight module according to any of above embodiments. The specific technical solution is the same as that of the above embodiment, details being omitted here. The display device may be: a liquid crystal television, a liquid crystal display device, a digital photo frame, a cell phone, a tablet computer, or any other product or component possessing a display function.

The descriptions made above are merely exemplary embodiments of the invention, but are not used to limit the protection scope of the invention. The protection scope of the invention is determined by attached claims.

What is claimed is:

1. A backlight module, comprising:
a light source;
a light guide plate, one primary surface of which is a light exiting face; and
a side-glowing optical fiber;
wherein the side-glowing optical fiber comprises a light emitting section and a light guide section, the light emitting section is fixed to at least one side of the light guide plate, the light guide section extends from the light emitting section to the outside of the light guide plate, and a terminal of the light guide section is connected to the light source, wherein, the side-glowing optical fiber is four side-glowing optical fibers; and light emitting sections of the four side-glowing optical fibers are closely attached to four sides of the light guide plate, respectively,
wherein four light sources provide light to four side-glowing optical fibers in such a manner that they are connected to the four side-glowing optical fibers through four couplers, respectively, or two light sources provide light to four side-glowing optical fibers in such a manner that each light source is connected to two adjacent side-glowing optical fibers through one coupler, respectively.

2. The backlight module according to claim 1, wherein, the light source is connected to the terminal of the light guide section of the side-glowing optical fiber through a coupler.

3. The backlight module according to claim 1, wherein, the light emitting section of the side-glowing optical fiber is closely attached to the at least one side of the light guide plate;
on one side of the light emitting section of the side-glowing optical fiber which is not in contact with the light guide plate, there is provided a light-tight cladding; and
around the light guide section of the side-glowing optical fiber, there is provided a light-tight cladding.

4. The backlight module according to claim 1, further comprising:
a side reflector disposed on a side of the light guide plate, the side reflector being disposed in opposition to the light guide plate with respect to the light emitting section of the side-glowing optical fiber.

5. The backlight module according to-claim 1, further comprising;
a bottom reflector that is disposed on one face side of the light guide plate which is opposite to the light exiting face.

6. A display device, comprising the backlight module according to claim 1.

7. A backlight module, comprising:
a light source;
a light guide plate, one primary surface of which is a light exiting face; and
a side-glowing optical fiber;
wherein the side-glowing optical fiber comprises a light emitting section and a light guide section, the light emitting section is fixed to at least one side of the light guide plate, the light guide section extends from the light emitting section to the outside of the light guide plate, and a terminal of the light guide section is connected to the light source, wherein,
the side-glowing optical fiber is four rows of side-glowing optical fibers, each row being constituted by a plurality of side-glowing optical fiber in parallel,
wherein four light sources provide light to four rows of side-glowing optical fibers in such a manner that they are connected to the four rows of side-glowing optical fibers through four couplers, respectively, or two light sources provide light to four rows of side-glowing optical fibers in such a manner that each light source is connected to two adjacent rows of side-glowing optical fibers through one coupler, respectively.

8. A backlight module, comprising:
a light source;
a light guide plate comprising two primary surfaces, one primary surface of which is a light exiting face and a second primary surface; and
a side-glowing optical fiber;

wherein the side-glowing optical fiber comprises a light emitting section and a light guide section, the light emitting section is fixed to one face side of the light guide plate which is opposite to the light exiting face, the light guide section extends from the light emitting section to the outside of the light guide plate, and a terminal of the light guide section is connected to the light source, wherein the side-glowing optical fiber comprises a plurality of side-glowing optical fibers arranged in parallel.

9. The backlight module according to claim 8, wherein, the plurality of side-glowing optical fibers are distributed over the second primary surface of the light guide plate which is opposite to the light exiting face.

10. The backlight module according to claim 9, wherein, the plurality of side-glowing optical fibers are distributed uniformly.

11. The backlight module according to claim 8, further comprising:

a side reflector disposed on a side of the light guide plate and a bottom reflector disposed on a face side of the light guide plate which is opposite to the light exiting face, the bottom reflector being disposed in opposition to the light guide plate with respect to the side-glowing optical fiber.

\* \* \* \* \*